May 15, 1951     W. H. PARHAM     2,552,687
TRAILER BRAKE ACTUATOR
Filed June 20, 1949
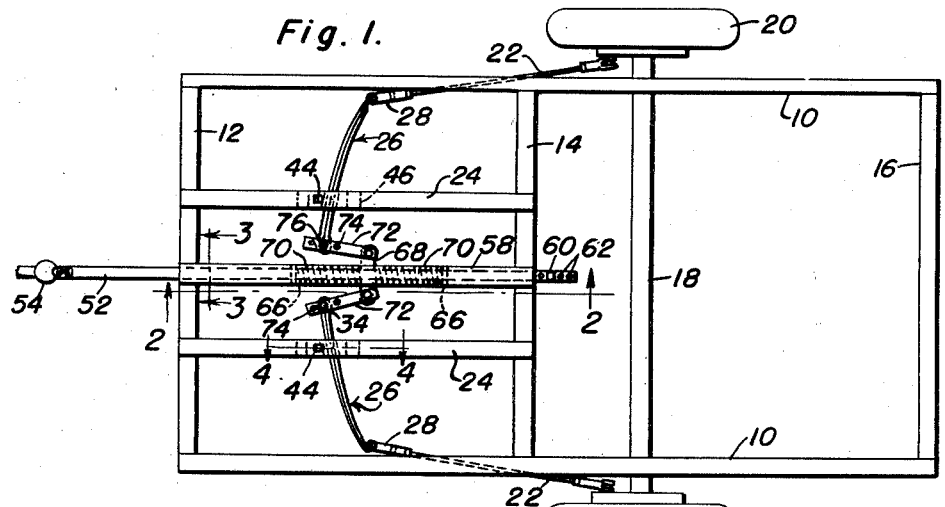
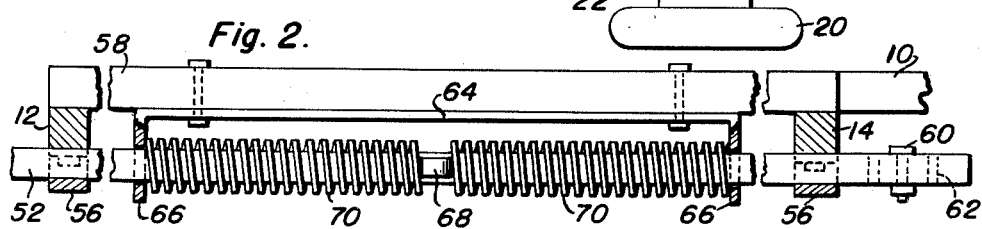
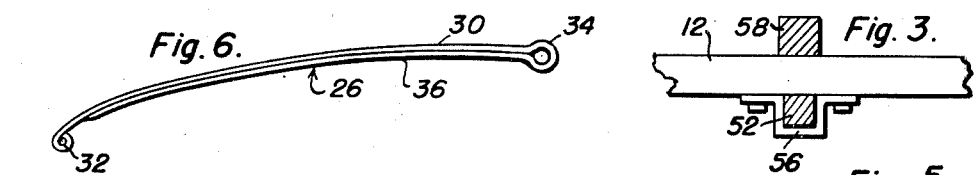
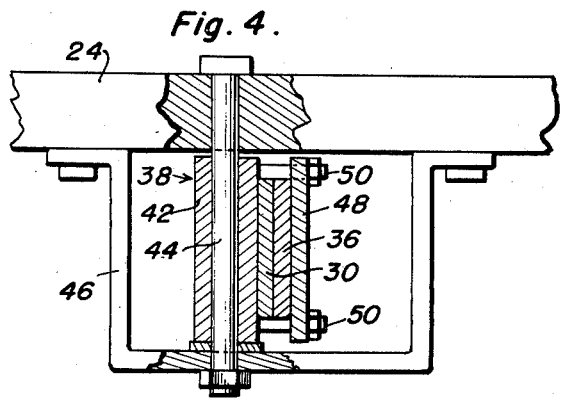
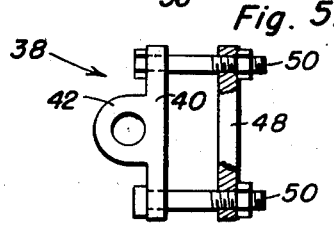
Inventor
William H. Parham
By *Clarence A. O'Brien*
*and Harvey B. Jacobson*
Attorneys

Patented May 15, 1951

2,552,687

UNITED STATES PATENT OFFICE 2,552,687

TRAILER BRAKE ACTUATOR

William H. Parham, Eustis, Fla.

Application June 20, 1949, Serial No. 100,262

1 Claim. (Cl. 188—112)

This invention relates generally to trailers and more particularly to a trailer coupling and braking apparatus wherein the movement of the drawbar of the trailer relative to the chassis of the trailer controls the application of the brake associated with each ground contacting wheel of the trailer.

A primary object of this invention is to provide resilient coupling means between the drawbar and the brake mechanism in order to achieve a softened braking action, with elimination of jerking of the trailer such as is experienced during the normal operation of trailers hitched by conventional means.

Another object of this invention is to provide a trailer coupling and brake operating assembly which is capable of adjustment through a wide range in order to suit the particular needs of the user dictated by the character of the trailer, specific characteristics of the brakes on the trailer and the connecting means therefor and other conditions, so that the herein disclosed assembly is exceedingly versatile and applicable to a very wide range of trailer equipment.

Still another object of this invention is to provide a trailer coupling and brake operating assembly which can be used with conventional equipment and which is easily mounted upon many different types of trailers.

And a last object to be mentioned specifically is to provide a device of this character which will improve the degree of safety with which trailer equipment can be operated, which is simple in its operation, easily repaired and adjusted, and which will give generally efficient and durable service.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 1 is a top plan view of a trailer chassis with this invention operatively applied thereon;

Figure 2 is a longitudinal vertical sectional view, taken substantially upon the line 2—2 in Figure 1;

Figure 3 is a transverse vertical sectional view, taken on the line 3—3 in Figure 1;

Figure 4 is a vertical sectional view taken substantially on the line 4—4 in Figure 1;

Figure 5 is a top plan view of the pivot bracket means used to mount the resilient levers on the chassis; and Fig. 6 is a plan view of one of the resilient levers.

Similar characters of reference designate similar or identical elements and portions throughout the specification and throughout the different views of the drawings.

Referring now to the drawings in detail, this invention includes a trailer chassis having laterally longitudinally disposed frame members 10 and front, intermediate and rear cross frame members 12, 14 and 16, respectively. The chassis also includes an axle 18, ground contacting wheels 20 and these wheels will be equipped with brake mechanisms including brake rods 22.

According to this invention, the chassis will be provided with further brace members 24 secured to and between the front and intermediate cross members 12 and 14, and a pair of similar resilient levers, generally indicated at 26, are pivotally mounted upon the base members 24 as hereinafter described more fully and the outer ends of the resilient levers 26 are pivotally secured to the brake rods 22 by suitable means such as the stirrups 28. To facilitate such attachment, each resilient lever 26 has a barrel 32 on the outer end thereof, and it will be noted that a preferred construction of these resilient levers will involve the use of spring sheet metal straps 30, further looped as indicated at 34 and having the returned portions 36 abutting the portion indicated at 30 and reinforcing the same.

Pivot bracket means, generally indicated at 38, is provided for the mounting of each of these resilient levers 26 upon the brace members 24. Each pivot bracket includes a plate 40 with a socket 42 integrally formed therein, and a pivot bolt 44 is inserted through each of the brace members 24 and through the socket 42, a U-shaped bracket 46 being provided in each case to support the lower end of the pivot bolt 44, the U-shaped brackets being bolted or otherwise secured to the undersurfaces of the brace members 24. The pivot brackets 38 also include clamping plates 48 held in place by bolts 50 and nuts thereon and clamping intermediate portions of the resilient levers 26 in a manner which will be obvious from an inspection of Figure 4. It should be carefully noted that this construction allows simple and easy adjustment of the resilient levers within the pivot brackets 38.

A drawbar 52, preferably square in cross section, will be secured at its front end, by a universal joint assembly indicated at 54, to the powered vehicle, and U-shaped brackets 56 will be used to mount this drawbar 52 upon the front and intermediate cross frame members 12 and 14 so as to allow longitudinal movement of the drawbar relative to the chassis. A centrally disposed brace 58 will be secured to and between the said cross frame members 12 and 14. A king bolt 60 will be selectively securable in a plurality of apertures 62 provided in longitudinally spaced relation on a rear end portion of the drawbar 52, adjacent to and immediately to the rear of the intermediate cross frame member 14, to comprise means for limiting the forward movement of the drawbar 52 relative to the chassis.

An inverted U-shaped bracket 64, termed herein the drawbar support, is secured to the underside of the central brace 58 by bolts or any other suitable means and this drawbar support includes downwardly turned end portions 66 which are apertured to receive intermediate portions of drawbar 52. The drawbar 52 is provided with an enlargement 68 substantially halfway between the downwardly turned end portions 66 of the support 64, and a pair of helical springs 70 are arranged coaxially of the drawbar 52 and compressed between the enlargement 68 and the said end portions 66 of the support 64, so that the drawbar is urged toward what will be referred to herein as the neutral position.

A pair of inflexible links 72 are pivotally secured to the outer ends of the enlargement 68 and these links are provided with a plurality of spaced apertures 74, and a pin 76 is provided for selective insertion through the loops 34 of the resilient levers 26 and through these apertures 74, so that further adjustment of the resilient levers may be achieved.

The operation of this invention will be clearly understood from a consideration of the foregoing description of the mechanical details thereof, taken in connection with the above recited objects and the drawings. In recapitulation, it may be further noted that when the trailer is being operated normally, or during the acceleration thereof, the king bolt 60 will engage the intermediate frame brace member 14 and a slight compression of the forwardmost of the springs 70 will be involved. When the acceleration is stopped, the said compressed spring 70 will gradually urge the drawbar 52 into neutral position. If the towing vehicle further slows in speed, the trailer will tend to approach the towing vehicle and the drawbar 52 will move rearwardly relative to the drawbar support 64 compressing the rearwardmost of the springs 70 and causing the links 72 to pivot the resilient levers 26 so as to apply the brakes on the ground contacting wheels 20 of the trailer. It should be carefully noted that the springs 70 soften the action of the braking mechanism, by directly controlling the movement of the drawbar 52. Provision of the resilient levers 26, in place of relatively non-resilient levers used in somewhat similar constructions, further softens the action of the braking mechanism. Finally, the extreme versatility of the device, by reason partially of the adjustability of the resilient levers 26 in the pivot brackets 38 and the adjustability of the loops 34 other resilient levers in the links 72, together with the adjustability of the brake rods 22 with respect to the resilient levers, will be apparent, and it will also be clear that all of the above recited objects are amply achieved by this invention.

Obviously minor variation from the disclosed embodiment may be made without departure from the spirit of this invention.

Having described the invention, what is claimed as new is:

In combination with a trailer having wheel brakes and a chassis, a drawbar support, a drawbar longitudinally slidably mounted in said support, means to limit the movement of said drawbar in one direction relative to said support, resilient levers comprised of leaf springs and pivot brackets including clamping plates bolted on the leaf springs intermediate the ends of the levers and pivoted on said chassis, said levers being each operatively connected at one end of said drawbar and each operatively connected at the other end to one of said wheel brakes to apply said brakes when the drawbar is moved in the opposite direction relative to said support, said chassis including a brace extending longitudinally of the chassis, said support being mounted on said brace, said drawbar having an enlargement, springs arranged coaxially of said drawbar and compressed between said enlargement and opposite end portions of said support, said levers having links of adjustable lengths connecting the levers to said enlargement, said means to limit the movement of the drawbar in one direction comprising a plurality of apertures in said drawbar adjacent a portion of said chassis and a king bolt selectively insertable in said apertures and engaging said portion of the chassis when the drawbar is in one position.

WILLIAM H. PARHAM.

REFERENCES CITED

The following references are of record in the file of this patent:

UNITED STATES PATENTS

| Number | Name | Date |
|---|---|---|
| 1,717,977 | Houston | June 18, 1929 |
| 1,725,548 | Swanson et al. | Aug. 20, 1929 |
| 2,035,023 | Sather | Mar. 24, 1936 |
| 2,149,624 | Owen | Mar. 7, 1939 |